United States Patent [19]

Birsching

[11] Patent Number: 5,690,143
[45] Date of Patent: Nov. 25, 1997

[54] VALVE FOR POWER STEERING GEAR

[75] Inventor: Joel Edward Birsching, Unionville, Mich.

[73] Assignee: General Motors Corporation, Detroit, Mich.

[21] Appl. No.: 633,874

[22] Filed: Apr. 8, 1996

[51] Int. Cl.⁶ .............................. F15B 9/10; F15B 13/04
[52] U.S. Cl. ...................... 137/625.23; 91/375 A; 91/443
[58] Field of Search .................. 91/375 A, 443; 137/625.23

[56] References Cited

U.S. PATENT DOCUMENTS

| | | |
|---|---|---|
| 3,022,772 | 2/1962 | Zeigler et al. |
| 3,106,938 | 10/1963 | Gordon ............................ 137/625.68 |
| 3,266,522 | 8/1966 | Gordon ............................ 137/625.69 |
| 4,445,422 | 5/1984 | Bishop ............................ 91/434 |
| 4,454,801 | 6/1984 | Spann ............................ 91/375 A |
| 4,469,342 | 9/1984 | Millard ............................ 91/375 A X |
| 4,852,462 | 8/1989 | Uchida et al. ............................ 91/375 A |
| 4,860,635 | 8/1989 | Uchida et al. ............................ 91/375 A |
| 5,417,244 | 5/1995 | Behrens et al. ............................ 91/375 A X |

Primary Examiner—Gerald A. Michalsky
Attorney, Agent, or Firm—Saul Schwartz

[57] ABSTRACT

A valve for a motor vehicle power steering gear including a tubular valve body having a plurality of internal lands, a valve spool rotatable inside of the valve body having a plurality of external lands, and a plurality of metering flats on the external lands which cooperate with linear edges of the internal lands in defining a pair of series connected metering orifices in a fluid flow path through the rotary valve from a pump to a reservoir. When the series connected metering orifices are fully closed, the effective circumferential overlap between the internal and external lands which prevents leakage from the pump to the reservoir is the sum of the circumferential overlaps at the individual metering orifices.

1 Claim, 4 Drawing Sheets

VALVE FOR POWER STEERING GEAR

FIELD OF THE INVENTION

This invention relates to rotary valves for motor vehicle power steering gears.

BACKGROUND OF THE INVENTION

U.S. Pat. Nos. 3,022,772 and 4,454,801, issued Feb. 27, 1962, and Jun. 19, 1984, respectively, and assigned to the assignee of this invention, describe a prior rotary control valve for a motor vehicle power steering gear which creates steering assist boost pressure by progressively closing a metering orifice in a flow path through the valve from a pump to a reservoir. The metering orifice is defined between a linear edge of an internal land on a tubular valve body and a metering flat on an external land on a valve spool rotatable inside of the valve body. As the valve spool rotates relative to the valve body from a center position in which the metering orifice is open, the linear edge on the internal land progressively further overlaps the metering flat on the external land. The metering orifice is fully closed at the limit of rotation of the valve spool relative to the valve body. At the fully closed metering orifice, a seal is defined by the circumferential overlap between the internal and external lands. That sealing overlap equals the angle of relative rotation of the valve spool minus the circumferential length of the metering flat. Obviously, the resistance of the seal to fluid leakage could be improved by increasing the amount of relative rotation of the valve spool and, therefore, the circumferential overlap at closure. However, because other performance criteria are negatively impacted by increasing relative rotation of the valve spool, it is difficult to achieve such improvement without resort to expensive, very high precision manufacturing techniques.

SUMMARY OF THE INVENTION

This invention is a new and improved rotary valve for a motor vehicle power steering gear including a tubular valve body having a plurality of internal lands, a valve spool rotatable inside of the valve body having a plurality of external lands, and a plurality of metering flats on the external lands which cooperate with linear edges of the internal lands in defining a pair of series connected metering orifices in a fluid flow path through the rotary valve from a pump to a reservoir. The limit of rotation of the valve spool relative to the valve body is substantially the same as in the aforesaid prior rotary valve and the series connected metering orifices are also both fully closed at such limit. When the series connected metering orifices are fully closed, the effective circumferential overlap between the internal and external lands which prevents leakage from the pump to the reservoir is the sum of the circumferential overlaps at the individual metering orifices. Because such effective circumferential overlap exceeds the circumferential overlap between internal and external lands in the aforesaid prior rotary valve when its single metering orifice is fully closed, the rotary valve according to this invention exhibits less fluid leakage at maximum pressure than the prior rotary valve.

DESCRIPTION OF A PREFERRED EMBODIMENT

Figure 1:
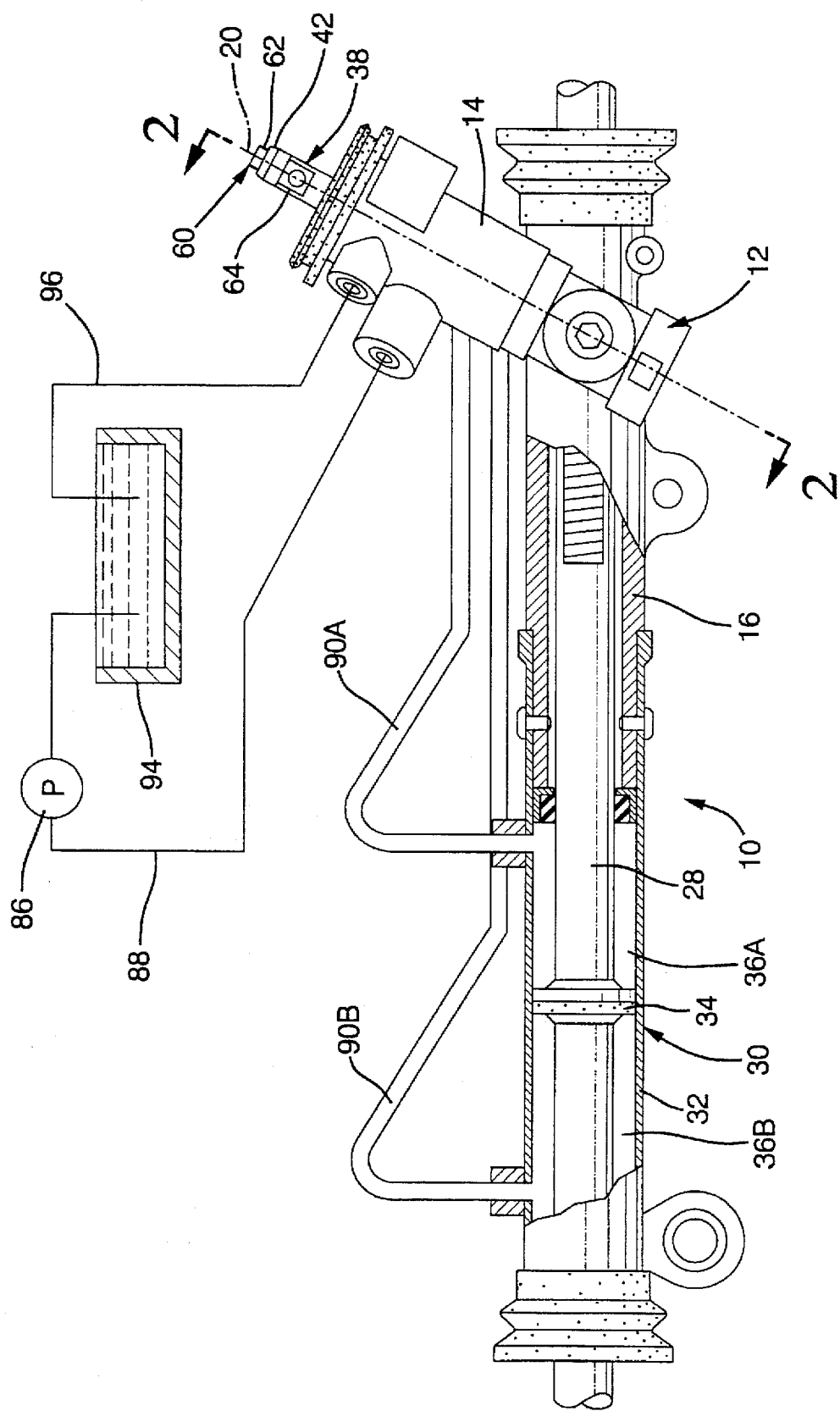
FIG. 1 is a partially broken-away view of a motor vehicle power steering gear having a rotary valve according to this invention.
Figure 2:
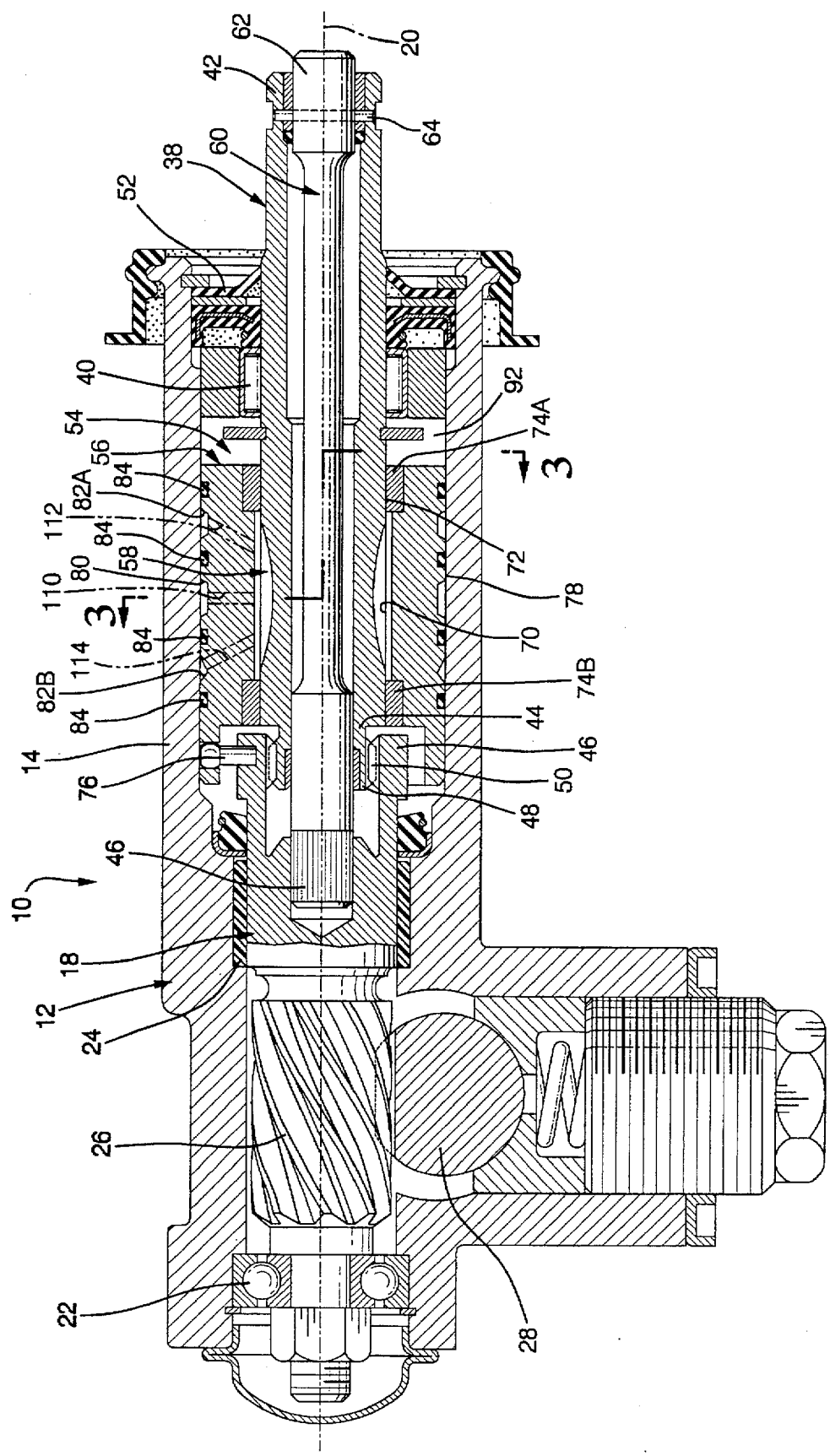
FIG. 2 is an enlarged sectional view taken generally along the plane indicated by lines 2—2 in FIG. 1.

Referring to FIGS. 1–2, a motor vehicle power steering gear 10 includes a housing 12 having a tubular valve housing portion 14 and a tubular rack housing portion 16. A pinion head 18 is supported on the housing 12 for rotation about a longitudinal centerline 20, FIG. 2, of the steering gear by a ball bearing 22 and by a sleeve bearing 24 on opposite sides of a pinion gear 26 of the pinion head. A rack bar 28 is supported in the rack housing portion 16 for back and forth linear translation. The pinion gear 26 meshes with rack gear teeth on the rack bar 28 to effect linear translation of the rack bar concurrent with rotation of the pinion head. Opposite ends of the rack bar 28, not shown, are linked to dirigible wheels of the motor vehicle in the usual way for steering the vehicle by back and forth translation of the rack bar.

A steering assist fluid motor 30 includes a cylinder 32 around the rack bar 28 rigidly attached to the rack housing portion 16 and an annular piston 34 on the rack bar which seals against the inside of the cylinder 32. Annular seals at opposite ends of the cylinder 32 seal against the rack bar 28 and cooperate with the piston 34 in defining a pair of variable volume working chambers 36A–36B of the fluid motor.

As seen best in FIG. 2, the steering gear 10 further includes a tubular input or spool shaft 38 supported on the valve housing portion 14 for rotation about the centerline 20 by a roller bearing 40. An outboard end 42 of the spool shaft is connected to a steering wheel, not shown, of the motor vehicle for unitary rotation therewith. An inboard end 44 of the spool shaft is received in a tubular end 46 of the pinion head 18 with circumferential clearance between a plurality of abutments 48 on the spool shaft and a corresponding plurality of abutments 50 on the pinion head so that the spool shaft is rotatable relative to the pinion head about the centerline 20. Relative rotation between the spool shaft 38 and the pinion head 18 is limited by engagement of the abutments 48,50 against each other. Importantly, the limit of such relative rotation between the spool shaft and the pinion head is substantially the same as in the steering gears having the aforesaid prior rotary valves. A fluid seal 52 closes the open end of the valve housing portion 14 around the spool shaft 38.

A rotary valve 54 according to this invention is disposed in the valve housing portion 14 and includes a tubular valve body 56 around the spool shaft 38, a valve spool 58 defined by the portion of the spool shaft inside the valve body, and a torsion bar 60 inside the tubular spool shaft 38. A first end 62 of the torsion bar is rigidly attached to the outboard end 42 of the spool shaft 38 by a cross pin 64. A second end 66 of the torsion bar protrudes beyond the inboard end 44 of the spool shaft and is rigidly connected by an interference fit to the pinion head 18. A sleeve being 68 between the torsion bar and the spool shaft 38 cooperates with the roller bearing 40 in supporting the spool shaft on the valve housing portion 14 for rotation about the centerline 20.

The tubular valve body 56 is rotatably supported on the valve spool 58 by a cylindrical inner wall 70 of the valve body closely received on a cylindrical outer wall 72 of the valve spool 58 and by a pair of metal rings 74A–74B seated in a corresponding pair of counterbores in opposite ends of the valve body. A radial pin 76 on the tubular end 46 of the pinion head 18 seats in a socket in the valve body 56 and connects the valve body to the pinion head for unitary rotation. In an open center position of the valve spool 58 and the spool shaft 38 relative to the valve body 56 and the pinion head 18, FIG. 3, the torsion bar is relaxed, i.e. not twisted. When the valve spool 58 is rotated relative to the valve body 56 by manual effort at the steering wheel, the torsion bar develops a restoring force which biases the valve spool back to its open center position.

An outside wall 78 of the valve body has an annular pressure groove 80 and a pair of annular cylinder grooves 82A-82B. A plurality of seal rings 84 on the valve body bear against the valve housing portion 14 to seal the grooves 80, 82A, 82B against leakage. The pressure groove 80 is connected to a pump 86 through a conduit 88. The cylinder grooves 82A, 82B are connected to the working chambers 36A-36B, respectively, of the fluid motor 30 through a pair of conduits 90A, 90B. A low pressure environment 92 inside the valve housing portion 14 is connected to a reservoir 94 through a conduit 96. An inlet of the pump 86 is also connected to the reservoir 94.

Figure 3:
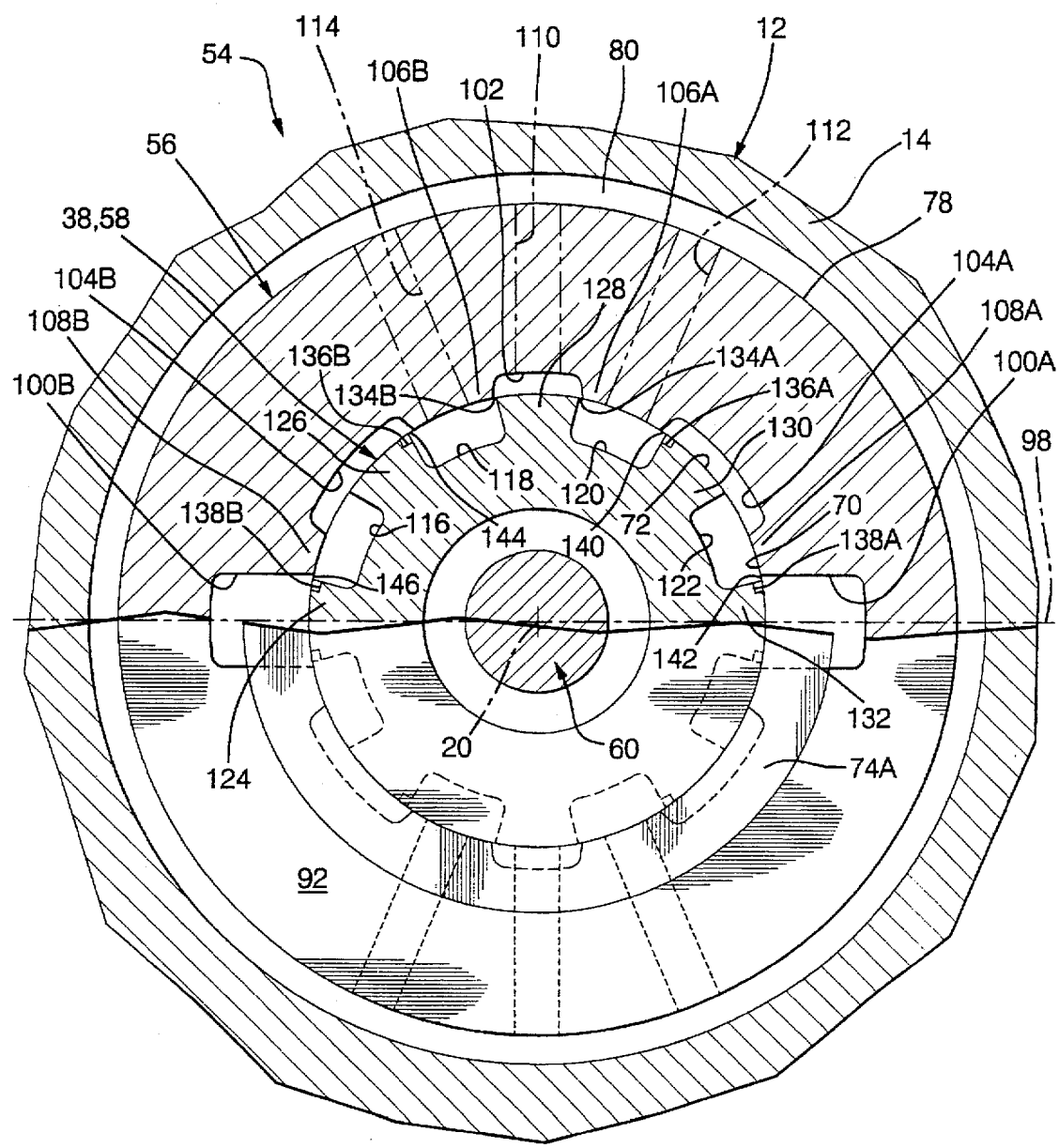
FIG. 3 is a partially broken-away sectional view taken generally along the plane indicated by lines 3—3 in FIG. 2.

Referring to FIG. 3, the remainder of the rotary valve 54 is now described structurally and functionally on only one side of a longitudinal plane of symmetry 98, it being understood that the other side is structurally and functionally the same. The inner cylindrical wall 70 of the valve body 56 is interrupted by a plurality of linear slots parallel to the centerline 20 including a pair of diametrically opposite return slots 100A-100B, a pressure slot 102, and a pair of intermediate slots 104A-104B on opposite sides of the pressure slot. The pressure slot 102 and the intermediate slots 104A, 104B are separated by a first pair of internal lands 106A-106B on the valve body. The intermediate slots 104A, 104B are separated from the return slots 100A, 100B, respectively, by a second pair of internal lands 108A-108B on the valve body.

The rings 74A, 74B on the valve body seal the ends of the pressure slot 102 and the ends of the intermediate slots 104A, 104B. The return slots 100A, 100B are deeper than the pressure and intermediate slots and, therefore, communicate with the low pressure environment 92 around the rings. A schematically represented radial bore 110 in the valve body 56 intersects the pressure groove 80 and the pressure slot 102. A schematically represented diagonal bore 112 in the valve body 56 intersects the cylinder groove 82A and the inner cylindrical wall 70 of the valve body in the middle of the internal land 106A. A schematically represented diagonal bore 114 in the valve body 56 intersects the cylinder groove 82B and the inner cylindrical wall 70 of the valve body in the middle of the internal land 106B.

The outer cylindrical wall 72 of the valve spool 58 is interrupted by a plurality of arc-shaped slots 116, 118, 120, 122 parallel to the centerline 20. The slots 116-122 end between the rings 74A-74B and are, therefore, fluid sealed at opposite ends. The arc-shaped slots 116-122 are flanked by a plurality of external lands 124, 126, 128, 130, 132 on the valve spool. In the open center position of the valve spool 58 relative to the valve body 56, the external lands 124, 132 face and are circumferentially overlapped by the return slots 100B, 100A in the valve body, respectively, the external land 128 faces and is overlapped by the pressure slot 102 in the valve body, and the external lands 126, 130 face and are overlapped by the intermediate slots 104B, 104A, respectively, in the valve body.

Figure 4:
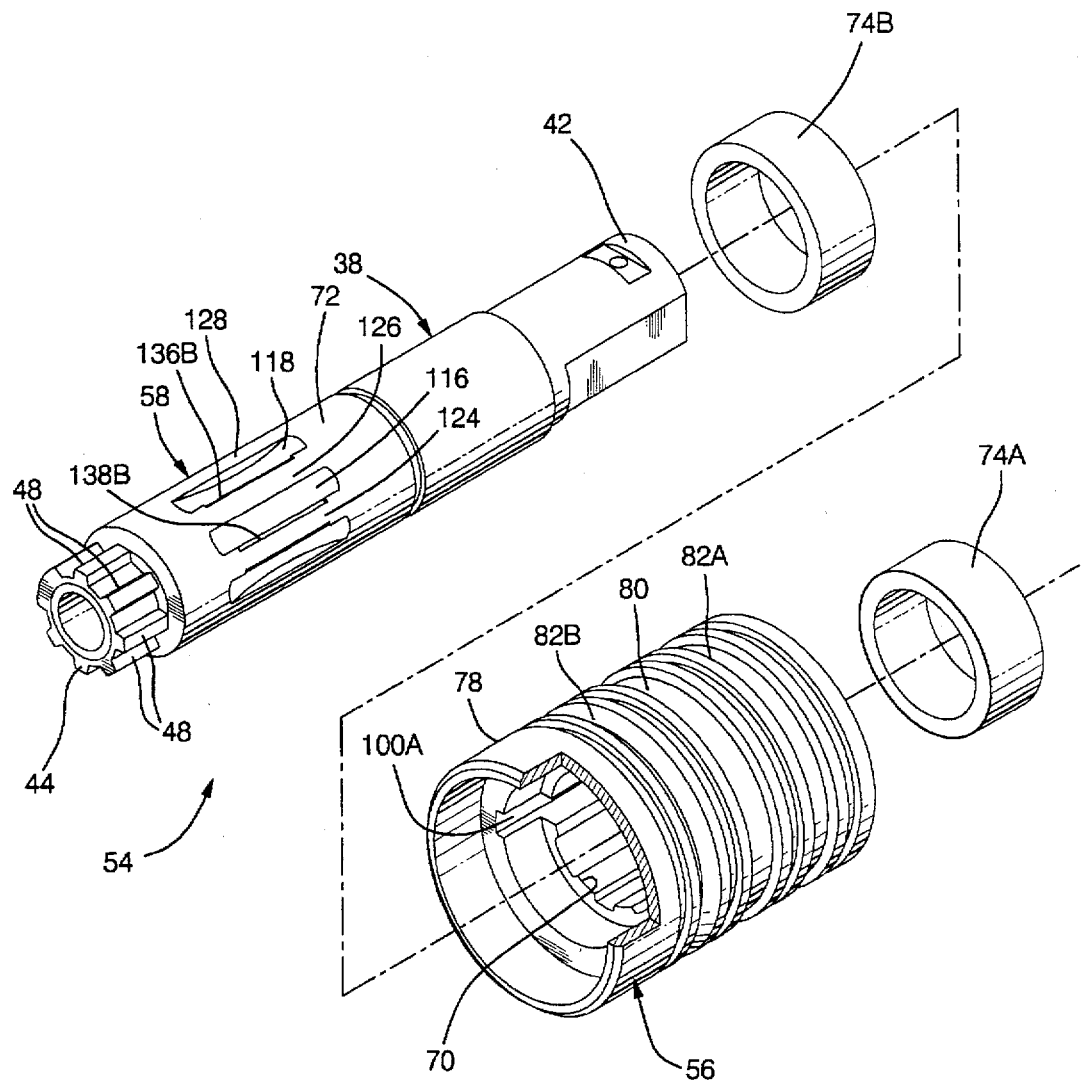
FIG. 4 is a fragmentary, exploded, perspective view of a rotary valve according to this invention.

As seen best in FIGS. 3-4, linear edges on the internal lands 106A, 106B and on the external land 128 define therebetween a pair of non-metering orifices 134A-134B in symmetric fluid flow paths from the pressure slot 102 to respective ones of the return slots 100A, 100B. A first pair of metering flats 136A-136B are formed on the external lands 130, 126, respectively, and illustrated in exaggerated fashion in FIG. 3 for clarity. A second pair of metering flats 138A-138B are formed on the external lands 132, 124, respectively, and also exaggerated fashion. The metering flats 136A, 138A cooperate with linear edges on the internal lands 106A, 108A, respectively, in defining a pair of series connected metering orifices 140, 142 in the fluid flow path from the pressure slot 102 to the return slot 100A. Similarly, the metering flats 136B, 138B cooperate with linear edges on the internal lands 106B, 108B, respectively, in defining a pair of series connected metering orifices 144, 146 in the other fluid flow path from the pressure slot 102 to the return slot 100B.

In the open center position of the valve spool relative to the valve body, the non-metering orifices 134A, 134B and the metering orifices 140-146 are all open. Fluid circulates at low pressure from the pump 86 to the reservoir 94 through both symmetric flow paths in the rotary valve from the pressure slot 102 to the return slots 100A, 100B. At the same time, both working chambers 36A, 36B of the fluid motor are filled and also exposed through the diagonal bores 112, 114 to the low pressure in the symmetric flow paths.

Manual effort applied at the steering wheel against the resistance of the torsion bar 60 rotates the valve spool 58 from its open center position relative to the valve body 56 through an angle proportional to the applied effort. At the very start of such relative rotation, one of the non-metering orifices, i.e. the active non-metering orifice, closes completely to separate the aforesaid symmetric flow paths into an active or pressure path exposed to the pressure slot 102 and an inactive or return path isolated from the pressure slot. Concurrently, the series connected metering orifices in the active flow path, i.e. the active metering orifices, commence throttling of flow through the active flow path to create a boost pressure therein which is communicated to the fluid motor through the corresponding one of the diagonal bores 112, 114.

At the limit of rotation of the valve spool 58 relative to the valve body 56, i.e. when the abutments 48 on the spool shaft 38 engage the abutments 50 on the pinion head 18, the active non-metering orifice and the active metering orifices are all completely closed and maximum pressure develops in the active fluid flow path through the valve. For example, with counterclockwise relative rotation of the valve spool 58, FIG. 3, the non-metering orifice 134B and the series connected metering orifices 140, 142 are the active non-metering and metering orifices, respectively, and are all closed when the aforesaid abutments 48, 50 engage. Again, as described above, the limit or relative rotation of the valve spool 58 in the steering gear 10 is substantially the same as in steering gears having the aforesaid prior rotary valve so that a driver exposed to both perceives no differences attributable to the rotary valve.

In the circumstance of the active non-metering orifice 134B and the active metering orifices 140, 142 all being fully closed, maximum pressure develops in the active flow path and urges fluid leakage between the internal land 128 and the external land 106B. The circumferential overlap between the lands 128, 106B at full closure corresponds to substantially the full extent of relative rotation between the valve spool and the valve body from the open center position and is about the same as the corresponding circumferential overlap in the aforesaid prior rotary valve. Accordingly, the fluid seal at the non-metering orifice 134B exhibits at least the same resistance to leakage as the corresponding seal in the aforesaid prior rotary valve which resistance has been observed to be commercially acceptable.

In the same circumstance, fluid at high pressure in the active flow path must traverse individual seals at each of the active metering orifices 140, 142 to achieve leakage to return slot 100A. The circumferential overlap between the internal lands 106A, 108A and the external lands 130, 132 defining the seals at the active metering orifices 140, 142, respectively, is less than the full extent of relative rotation of the valve spool 58 from its open center position by the circumferential length of the metering flats 136A, 138A. Such circumferential overlaps are, individually, about the same as the corresponding circumferential overlap at the closed metering orifice in the aforesaid prior rotary valve so that the seals at the active metering orifices 140, 142, individually, have about the same resistance to leakage as the corresponding seal in the aforesaid prior rotary valve. By virtue of the series connected relationship of the active metering orifices 140, 142, however, the effective circumferential overlap between the internal and external lands which prevents leakage to the return slot 100A is the sum of the circumferential overlaps at the individual active metering orifices 140, 142. Accordingly, because the sum of the circumferential overlaps at the active metering orifices 140, 142 exceeds the circumferential overlap at just the single metering orifice seal in the aforesaid prior rotary valve, the rotary valve 54 according to this invention experiences less fluid leakage at maximum pressure than such prior rotary valve.

I claim:

1. A valve for a power steering gear including a tubular valve body, a cylindrical valve spool inside of said valve body rotatable relative to said valve body from an open center position, abutment means limiting rotation of said valve spool relative to said valve body to a limit position, a pair of symmetric fluid flow paths in said valve from a pressure slot in said valve body to respective ones of a pair of return slots in said valve body, non-metering orifice means responsive to rotation of said valve spool relative to said valve body from said open center position to isolate a first one of said pair of symmetric flow paths from said pressure slot, and metering orifice means responsive to rotation of said valve spool relative to said valve body from said open center position to progressively throttle fluid flow through a second one of said pair of symmetric flow paths until fluid flow therein is blocked, characterized in that said metering orifice means comprises:

a first metering orifice in said second one of said pair of symmetric flow paths defined between a linear edge of said return slot in said valve body and a linear edge of a first external land on said valve spool having a metering flat thereon said first metering orifice having a maximum flow area in said open center position of said valve spool and zero flow area at an intermediate position of said valve spool in which said linear edge of said return slot circumferentially overlaps only said metering flat, said linear edge of said return slot circumferentially overlapping said first external land beyond said metering flat thereon at said limit position of said valve spool to define a first seal against fluid leakage from said second one of said pair of symmetric flow paths, and a second metering orifice in said second one of said pair of symmetric flow paths in series flow relationship with said first metering orifice defined between a linear edge of a closed intermediate slot in said valve body between said pressure slot and said return slot and a linear edge of a second external land on said valve spool having a metering flat thereon, said second metering orifice having a maximum flow area in said open center position of said valve spool equal to said maximum flow area of said first metering orifice in said open center position of said valve spool and zero flow area at said intermediate position of said valve spool in which said linear edge of said closed intermediate slot circumferentially overlaps only said metering flat on said second external land, said linear edge of said closed intermediate slot circumferentially overlapping said second external land beyond said motoring flat thereon at said limit position of said valve spool to define a second seal against fluid leakage from said second one of said symmetric flow paths toward said return slot, said second seal cooperating with said first seal in doubling the effective overlap between said valve body and said valve spool corresponding to rotation of said valve spool between said intermediate position and said limit position.

* * * * *